United States Patent

Phillips et al.

[15] 3,645,140
[45] Feb. 29, 1972

[54] PRESSURE GAUGE

[72] Inventors: James W. Phillips, Michigan City; Richard S. Zoludow, South Bend, both of Ind.

[73] Assignee: Dwyer Instruments, Inc.

[22] Filed: June 15, 1970

[21] Appl. No.: 46,141

Related U.S. Application Data

[63] Continuation-in-part of Ser. No. 735,339, June 7, 1968, Pat. No. 3,566,060.

[52] U.S. Cl. .......................................................73/407 R
[51] Int. Cl. .........................................................G01l 7/08
[58] Field of Search..........................73/407 R, 406, 410, 710

[56] References Cited

UNITED STATES PATENTS

| | | | |
|---|---|---|---|
| 3,397,319 | 8/1968 | Locke | 73/407 |
| 2,509,644 | 5/1950 | Kinderman | 73/407 |
| 2,722,837 | 11/1955 | Dwyer | 73/407 |

*Primary Examiner*—Louis R. Prince
*Assistant Examiner*—Daniel M. Yasich
*Attorney*—Mann, Brown, McWilliams & Bradway

[57] ABSTRACT

A pressure gauge in the form of two pressuretight compartments separated by a flexible diaphragm in which the gauge housing serves as the low-pressure chamber and a cover member secured to the housing over the diaphragm defines the high-pressure chamber. The gauge range spring is a leaf spring anchored to the housing at one of its ends with the other end of the spring carrying a permanent magnet that is disposed adjacent a rotatably mounted helix carrying an indicating arm which cooperates with the gauge scale. The leaf spring is connected to the diaphragm for movement by same, the spring rate of the leaf spring is adjustable externally of the housing by moving a shiftable fulcrum, and zero adjustment is provided including a threaded member actionable from outside the housing. The gauge is designed for low profile by placing both the high- and the low-pressure connections at the low-pressure side of the gauge, and providing for communication through the diaphragm to the high-pressure chamber.

16 Claims, 17 Drawing Figures

INVENTORS
JAMES W. PHILLIPS
RICHARD S. ZOLUDOW
BY
Mann, Brown, McWilliams + Bradway
ATTORNEYS

INVENTORS
JAMES W. PHILLIPS
RICHARD S. ZOLUDOW

INVENTORS
JAMES W. PHILLIPS
RICHARD S. ZOLUDOW
BY
Mann, Brown, McWilliams & Bradway
ATTORNEYS

PRESSURE GAUGE

This application is a continuation-in-part of our pending application Ser. No. 735,339, filed June 7, 1968, now Pat. No. 3,566,060 the filing date of which is claimed for all subject matter common thereto.

This invention relates to pressure gauges of the type suitable for such purposes as, for instance, reading static pressure, total pressure, air velocity pressure, draft pressure, differential pressure, air resistance, or gas pressure in any equipment involving air movement, and more particularly relates to a sealed capsule-type gauge of the differential pressure type including a flexible diaphragm connected to operate the sensitive and accurate motion transforming type of indicator mechanism mounted directly in the capsule.

Conventional pressure gauges of the type indicated are ordinarily arranged so that the high- and low-pressure connections are on opposite sides of the diaphragm, resulting in a high-profile device. Furthermore, the various parts of same are frequently complex and overly expensive to make.

A principal object of this invention is to provide a low-profile differential gauge of simplified design.

Another principal object of this invention is to provide a differential pressure gauge of improved response by minimizing internal gauge volume.

Still another principal object of the invention is to provide a low-profile differential pressure gauge with improved externally adjustable range spring and zero adjust arrangements.

Yet other objects of the invention are to provide a pressure gauge of the differential pressure type that is economical of manufacture, convenient to apply and use, and long lived in operation.

In accordance with this invention, I have provided a differential pressure gauge in which the housing has an open end that is closed by the diaphragm which is in turn covered by a cover member, with the diaphragm thus dividing the instrument into low- and high-pressure chambers, and with the housing diaphragm, and cover being arranged to have both the high- and low-pressure connections at the low-pressure side of the gauge, and to permit transmission of the high pressure through the diaphragm to the high-pressure chamber. The diaphragm is connected to a leaf spring that forms the range spring of the instrument and is anchored at one end of same to the housing and is provided with a simplified but effective shifting fulcrum for changing the calibration of the instrument externally of the housing. The leaf spring at its free end carries a plate magnet that is disposed adjacent a helix formed from a material of high-magnetic permeability that extends substantially perpendicular thereto, which plate magnet is adapted to cooperate with the helix to rotate same on deflection of the diaphragm. The helix has secured thereto an indicator which cooperates with the gauge scale for reading the gauge. Associated with he leaf spring is a zero adjustment arrangement including a threaded element rotatably mounted in the gauge housing and arranged for external adjustment. All parts of the gauge are designed for quick and inexpensive production.

Other objects, uses and advantages will be obvious or become apparent from a consideration of the following detailed description and the application drawings in which like parts are indicated by like reference numerals throughout the several views.

However, it is to be understood that the specific drawing figures provided are supplied primarily to comply with the requirements of the Patent Code, and that the invention may have other embodiments that will be obvious to those skilled in the art, and which are intended to be covered by the appended claims.

GENERAL DESCRIPTION

Figure 1:
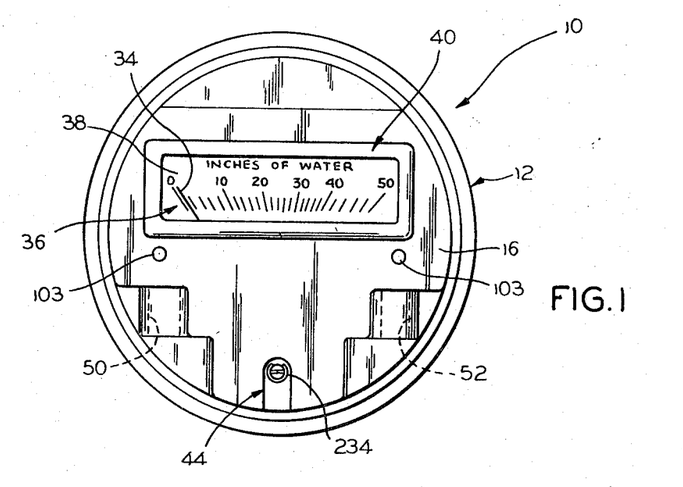
FIG. 1 is a front view of the front side of a gauge embodying the principles of this invention.
Figure 2:
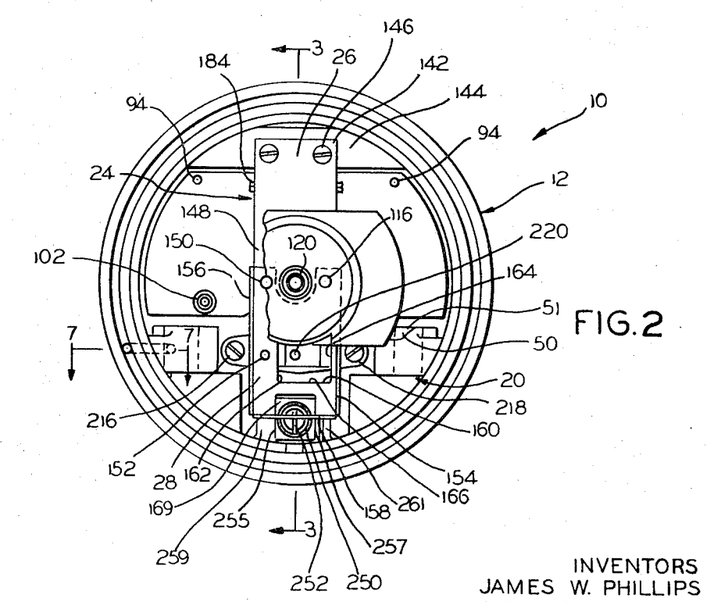
FIG. 2 is a rear view of the gauge of FIG. 1, with the diaphragm and housing back cover removed, showing the general arrangement of the low-pressure chamber of the gauge in plan (with parts being broken away)
Figures 3, 3A, 4, 5:
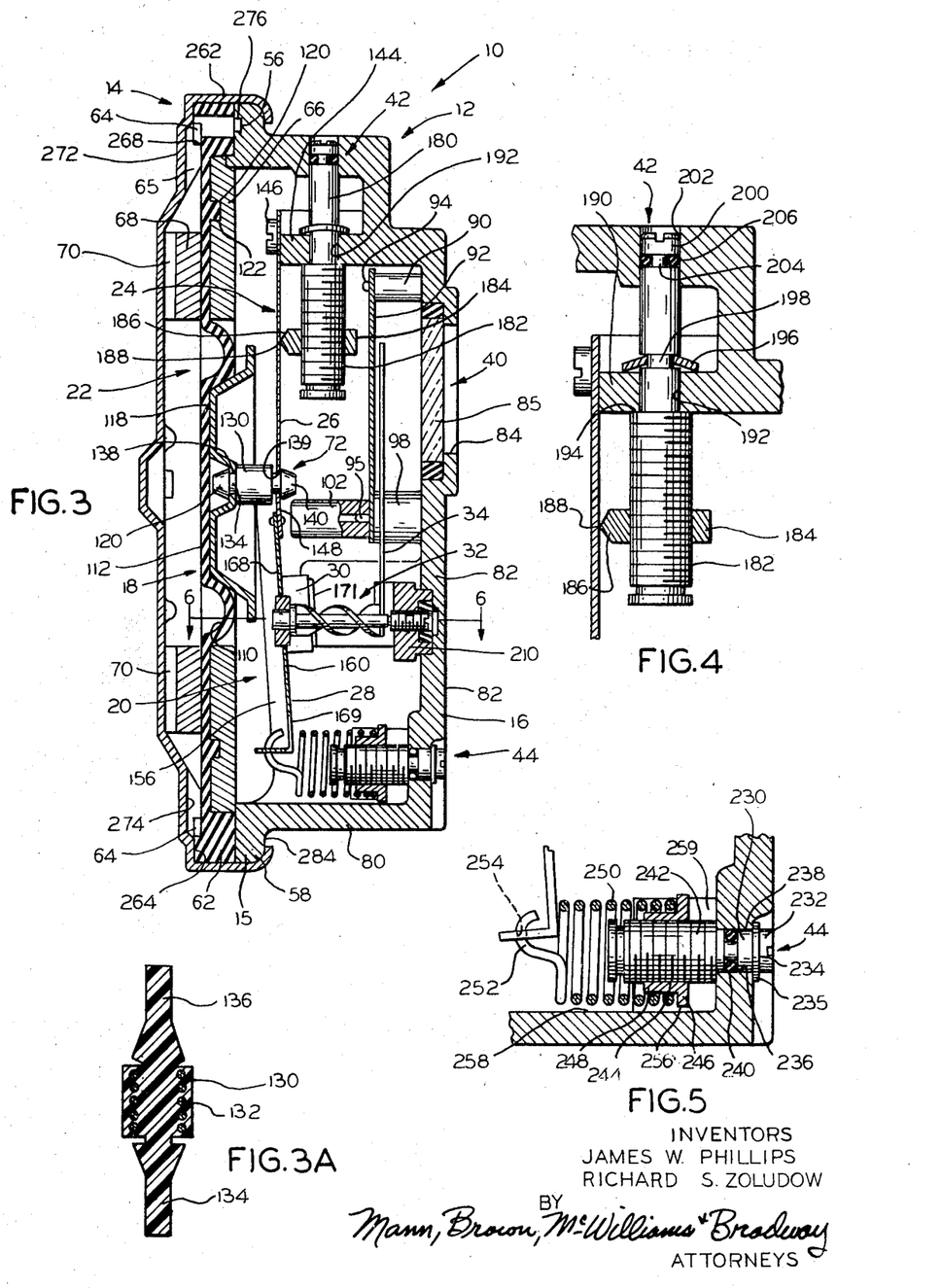
FIG. 3 is a diagrammatic cross-sectional view taken substantially along line 3—3 of FIG. 2, and on an enlarged scale, with the diaphragm, back cover and related parts in place.
FIG. 3A is a diagrammatic sectional view of the body of the connecting device shown in FIG. 3 for connecting the diaphragm plate to the gauge range spring.
FIG. 4 is an enlarged view of the gauge range spring adjustment that is shown in FIG. 3.
FIG. 5 is an enlarged view of the zero adjustment arrangement of FIG. 3.

Reference numeral 10 of FIGS. 1, 2 and 3 generally indicates one embodiment of the pressure gauge of this invention, which comprises a housing 12, formed from any suitable material, such as die cast aluminum, zinc, plastic, or the like, and defining an open end 15 and a closed end 16, and having applied across its open end 15 and edge mounted diaphragm 18, which is enclosed by the back cover member 14.

The housing 12 and diaphragm 18 define a low-pressure chamber 20 while the cover member 14 and diaphragm 18 define a high-pressure chamber 22.

The housing 12 mounts a calibratable range spring 24 in the form of leaf spring 26 having applied to its free end a mounting plate 28 carrying a plate magnet 30 that cooperates with a helix 32 journaled in the housing and carrying an indicator arm 34 for cooperation with the indicia 36 of scale plate 38 that is visible through window 40 in the closed side 16 of the housing.

In accordance with this invention, the range spring 24 is calibrated by adjustment device 42 (see FIG. 4) that is operable from the exterior of housing 12 to vary the live length of leaf spring 26. The zero position of the indicator 34 is adjusted by adjustment device 44 (see FIG. 5) that also may be operated from the exterior of the housing 12 to set the indicator arm 34 on the zero datum of scale plate 38.

Figure 7:
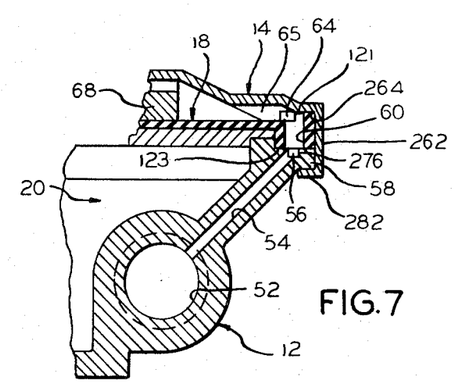
FIG. 7 is a fragmental view taken substantially along line 7—7 of FIG. 2 illustrating the manner in which the high-pressure connection of the gauge is connected to the high-pressure chamber of the gauge.

The low- and high-pressure connections of the gauge 10 are on the same side of the gauge, they being respectively applied to the threaded low-pressure connection passageway 50 and the high-pressure threaded passageway 52 (see FIGS. 1 and 7). The low-pressure passageway 50 communicates directly with low-pressure chamber 20 at port 51 (see FIG. 2) while the high-pressure passageway 52 communicates with the high-pressure chamber 22 through a bore 54 formed in the housing, an annular chamber or passageway 56 formed about the rim 58 of the housing, spaced openings 60, shown in FIGS. 7 and 8 formed in the rim 62 of the diaphragm, annular chamber or passageway 64 that is defined between the cover member 14 and the diaphragm rim 62, and spaced passageways 65 that are defined between the cover member 14 and the diaphragm. In the form shown, the gauge 10 is arranged for high-pressure differential service and includes annular filler plates 66 and 68, with the filler plate 68 being grooved as at 70 to complete communication with the high-pressure chamber 22.

The diaphragm 18 is operably connected to the leaf spring 26 as by connecting device 72.

During normal operation of the gauge, the diaphragm 18 will be deflected from left to right (as viewed in FIG. 3) to deflect leaf spring 26 through connection device 72 and through magnet 30 and cause rotation of helix 32 to change the position of indicator arm 34.

Figures 13, 14, 15:
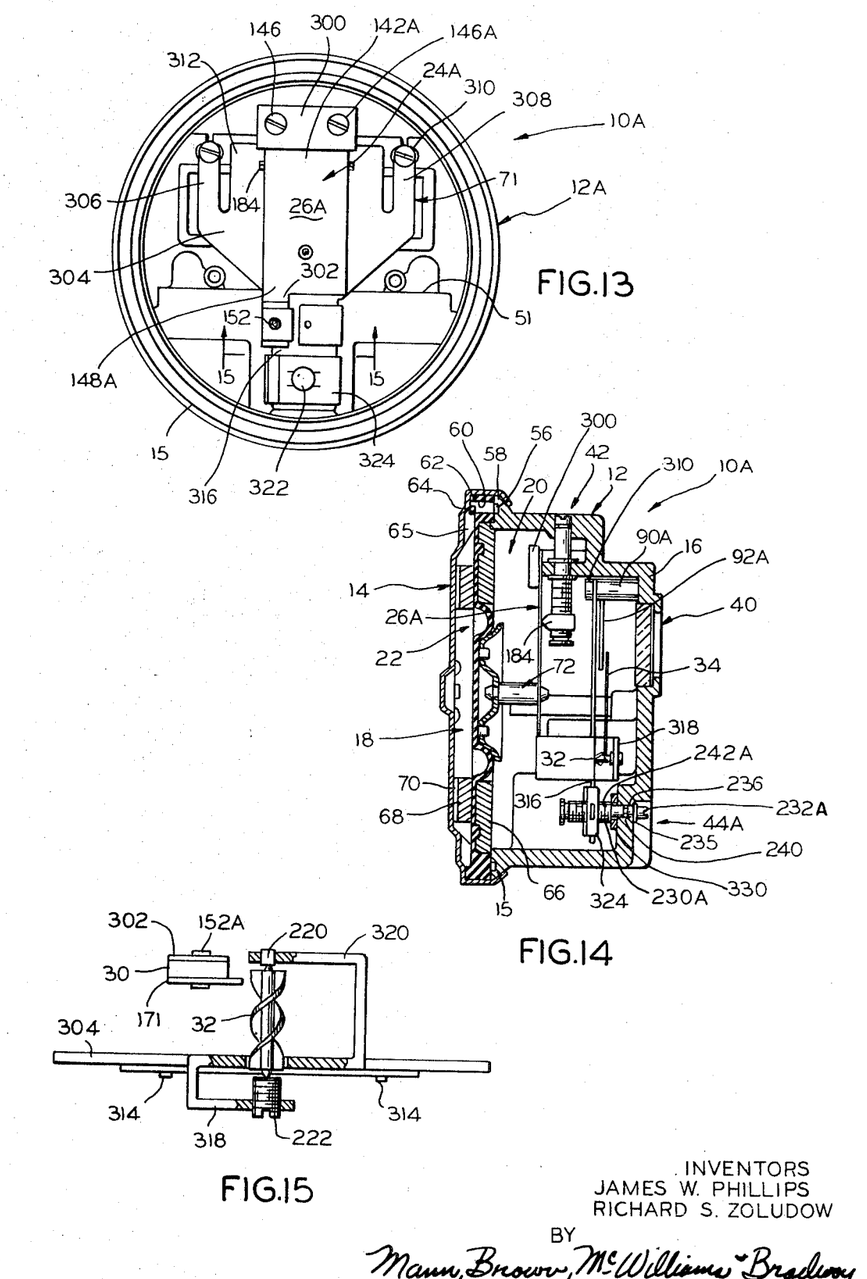
FIGS. 13 and 14 are views similar to those of FIGS. 2 and 3, respectively, illustrating a modified form of the invention.
FIG. 15 is a fragmental view of the helix and associated magnet of the embodiment of FIGS. 13 and 14, taken substantially along line 15—15 of FIG. 13, and with the helix shown in full elevation.

Pressure gauge 10A Of FIGS. 13–15 is similarly arranged as indicated by corresponding reference numerals, but includes a modified leaf spring 24A, a wishbone-type support structure 71 that mounts the helix 32, and a modified zero adjustment 44A that cooperates with the wishbone structure 71.

SPECIFIC DESCRIPTION

The plate magnet 30 and helix 32 comprises a magnetically coupled mechanism for translating straight line motion to rotary motion while avoiding mechanical friction. The deflection of leaf spring 26 is about a sufficiently large arc so that the magnet 30 undergoes essentially straight line movement along the axis of the helix 32. One end of the magnet is suitably disposed relative to the helix, which is preferably formed of material having high-magnetic permeability characteristics, with the result that upon movement of the magnet 30 axially of the helix, the helix undergoes rotational follower movement so as to maintain a minimum air gap between the helix and the magnet.

The housing 12 may be formed from die cast zinc, aluminum, molded plastic or the like, and is suitably shaped to define rim portion 58, upstanding sidewall 80 and front wall 82 that defines window opening 84 in which is suitably mounted transparent element 85 that forms the viewing window of the gauge (element 85 being a clear plastic, such as an acrylic, in the illustrated embodiment but clear polycarbonate, glass or other suitable materials may be employed depending on the application).

Upstanding from the wall 82 of the housing are a pair of studs 90 (only one is shown in FIG. 3) that support a scale plate 92 having the indicia 36 applied thereto, with the scale plate being received over a projection 94 of the respective studs 90. The scale plate 92 also is secured in place by being received over similar projections 95 of studs 98, each of which also frictionally receives a tubular diaphragm stop 102 that are thus disposed within the housing 12 on either side of the range spring to limit movement to the right of FIG. 3. The housing wall 82 is formed with suitable mounting screw holes 103 (see FIG. 1). Mounting screws also mount a suitable bezel trim piece on front of wall 82.

Figure 8:
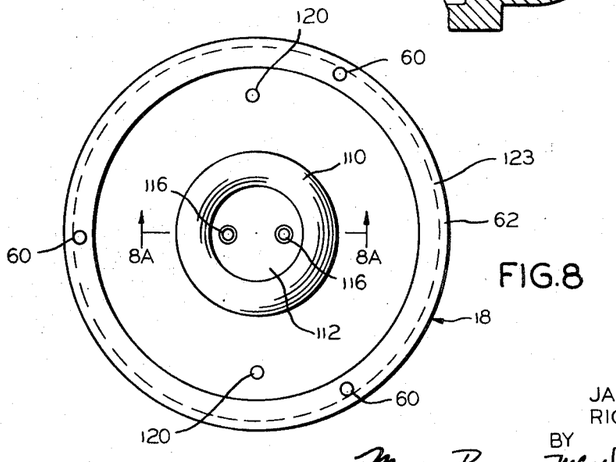
FIG. 8 is a front plan view of the gauge diaphragm, looking at the right-hand side of FIG. 3 and with the diaphragm plate omitted.
Figure 8A:
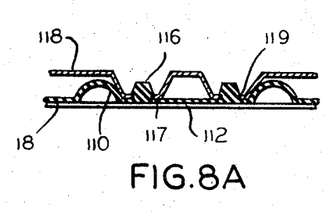
FIG. 8A is a fragmental cross-sectional view substantially along line 8A—8A of FIG. 8, with the diaphragm plate of FIG. 3 shown in place.

The diaphragm 18 may be formed from any suitable material, such as neoprene or silicone rubber and the form of the embodiment of FIGS. 7–8 is shaped to define the rim 62 together with the rim holes 60, annular flexing indentation 110 that is spaced from the rim portion 62 and defines a central disclike portion 112 that on one side thereof has a pair of projections or studs 116 (see FIGS. 2, 8 and 8A) adapted to frictionally fit into correspondingly located holes 117 in diaphragm plate 118 (projections or studs 116 being enlarged as at 119 for this purpose). The diaphragm 18 is also formed with a pair of projections 120 adapted to be frictionally received in recesses 122 of the low-pressure side cavity filler 66, the latter engaging the rim 58 of housing 12 about its open end 14. The side 121 of the diaphragm rim 62 is of reduced radial dimension as compared to its other side 123 to define with cover 14 the chamber 64.

The diaphragm plate 18 is connected to leaf spring 26 by connection device 72 which comprises a plastic body 130 (see FIG. 3A) having helical spring 132 (see FIG. 3A) embedded therein, and having extended from either end thereof headed stud portions 134 and 136. Stud portion 134 is frictionally received through opening 138 of diaphragm plate 18 and held in place by suitable head portion 120, while stud portion 136 is received through a suitable opening 139 in leaf spring 26 and held in place by its head portion 140 (head portions 120 and 140 being clipped to the lengths indicated in FIG. 3 after assembly of connection 72 to diaphragm plate 118 and leaf spring 26). Body 130 is preferably formed from a flexible polyurethane to allow connection device 72 to accommodate movement by bending, and its spring 132 is employed to make connection device 72 more rigid in compression for high-pressure ranges (the spring 132 may be omitted when employing the low-pressure diaphragm of FIGS. 9 and 10). The connection of body 130 to the diaphragm plate and leaf spring is sliding friction free (openings 138 and 139 are round and are filled by the respective stud portions 134 and 136).

Leaf spring 26 is secured cantilevered fashion at one end 142 thereof on wall 144 of housing 12, as by employing suitable screws 146. The other end 148 thereof has secured thereto by spaced eyelets 150 the mounting plate 28, which in turn has secured thereto by an appropriate rivet 152 the plate magnet 30.

The mounting plate 28 in the form shown includes side flanges 154 and 156 and end flange 158, for reinforcing purposes, and is formed to define a relatively rectangular window opening 160 (with which the helix 32 is aligned) that includes sides 162 and 164 that extend parallel to the leaf spring 26, and sides 166 and 168 that extend transversely thereof. Plate 28 also is formed with a smaller rectangular opening 169 adjacent flange 158.

In the form shown, the magnet 30 is in plate form and is surmounted by a relatively thin plate 171 of high-magnetic permeability defining an overhanging edge portion 170 that extends parallel to the leaf spring 26 and is disposed closely adjacent the helix 32. Plate 171 concentrates the magnetic lines of force in close adjacency to the helix and improves the sensitivity of the gauge.

The adjustment device 42 for calibrating the leaf spring 26 comprises screw member 180 having a threaded portion 182 which threadedly receives an elongated slide element 184 defining an edge portion 186 of generally triangular cross-sectional configuration which forms a fulcrum 188 for leaf spring 26. Screw member 180 is journaled in housing wall 144 by being received through opening 192 formed therein and having its shoulder 194 and a lock ring 196 that is seated in a groove 198 of member 180 being disposed against the housing wall 144. The head 200 of the screw member 180 extends into housing outer opening 202.

The head 200 of member 180 remains recessed within the housing opening 202, but is positioned for ready access thereto by a screw driver or the like. The head is formed with a groove 204 in which is received a suitable seal such as O-ring 206 for sealing off the housing at this point.

As indicated in FIG. 2, the slide element 184 extends transversely of the leaf spring 26 and exceeds its width somewhat. As the screw member 180 is journaled in the housing, on rotation of same, slide element 184, being held against rotation by its application against the leaf spring 26, will move lengthwise of the leaf spring to provide the fulcrum setting desired.

The helix 32 is journaled (see FIG. 6) by being applied to a saddle element 210 that is secured between spaced studs 212 and 214 by the respective screws 216 and 218. The helix is mounted between jeweled pivot bearings 220 and 222 mounted in the respective arms 223 and 225 of the saddle 210, with the bearing 222 being adjustably mounted.

Figure 6:
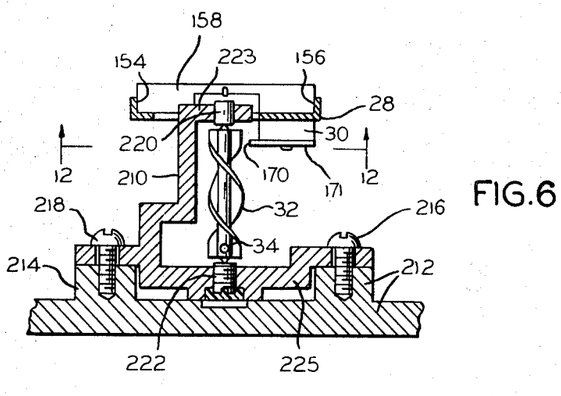
FIG. 6 is a fragmental cross-sectional view substantially along line 6—6 of FIG. 3 illustrating the magnetic motion translating device of the gauge.

As indicated in FIGS. 2 and 6, the helix 32 is mounted in alignment with the window 160 of the leaf spring mounting plate 28, and extends generally perpendicular to the leaf spring. The helix 32, being formed of a high-magnetic permeability material, aligns itself in the field of magnet 30 to maintain the minimum air gap between the magnet and the edges of the helix closest to same and to its plate 171. As the magnet moves parallel to the axis of the helix, the helix rotates to maintain this minimum air gap.

The adjustment device 44 (see FIG. 5) generally comprises a screw member 230 having a head portion 232 which is grooved as at 234 to receive a lock ring 235 and extends through opening 236 of the housing 12. Screw member 230 is grooved as at 238 to receive suitable O-ring 240 for sealing off the housing at the opening 236.

Screw member 230 includes a threaded portion 242 on which is received a slide element 244 that includes a flange portion 246 of square configuration and a cylindrical sleeve portion 248 over which is frictionally seated a coil-type tension spring 250 having a hooked end portion 252 that is received through opening 254 formed in he flange 158 of the leaf spring mounting plate 28.

The rectilinear edge 256 of slide 244 cooperates with wall surface 258 of housing 12, and edges 255 and 257 cooperate with housing walls 259 and 261, to maintain the slide member 244 against turning on rotation of screw member 230 by the application thereof of a suitable tool to its head 232. Thus, the slide member 244 will move axially of the screw member 230 on rotation of the latter to provide the zero adjustment for the gauge 10, thereby permitting the indicator arm 34 that is carried by the helix 32 to be set on the zero reading of the scale indicia 36.

The cover 14 defines an upstanding sidewall or rim 262, an annular recess 264 at the base of the rim 262, and a ridge 266 (see FIG. 11) defined by upstanding walls 268 and 270 on which the diaphragm seats inwardly of the diaphragm openings 60 (with the side 121 of the diaphragm rim being spaced therefrom to define annular chamber 64). The cover member is indented as at 272 to define spaced radial grooves 274 that form passageways 65 that connect chamber 64 with chamber 22. The housing rim 58 is grooved as at 276 to define the annular distributing chamber 56 that is communicated with by the housing laterally extending passage 54.

The relationship between the diaphragm openings 60 and chambers 56 and 64 avoids having to line up diaphragm openings 60 in any special manner relative to either housing 12 or cover 14 in assembling the gauge 10, as openings 60 provide the necessary communication through the diaphragm regardless of how openings 60 are disposed relative to housing bore 54 about central axis of the gauge.

Figures 9, 10, 11, 12:
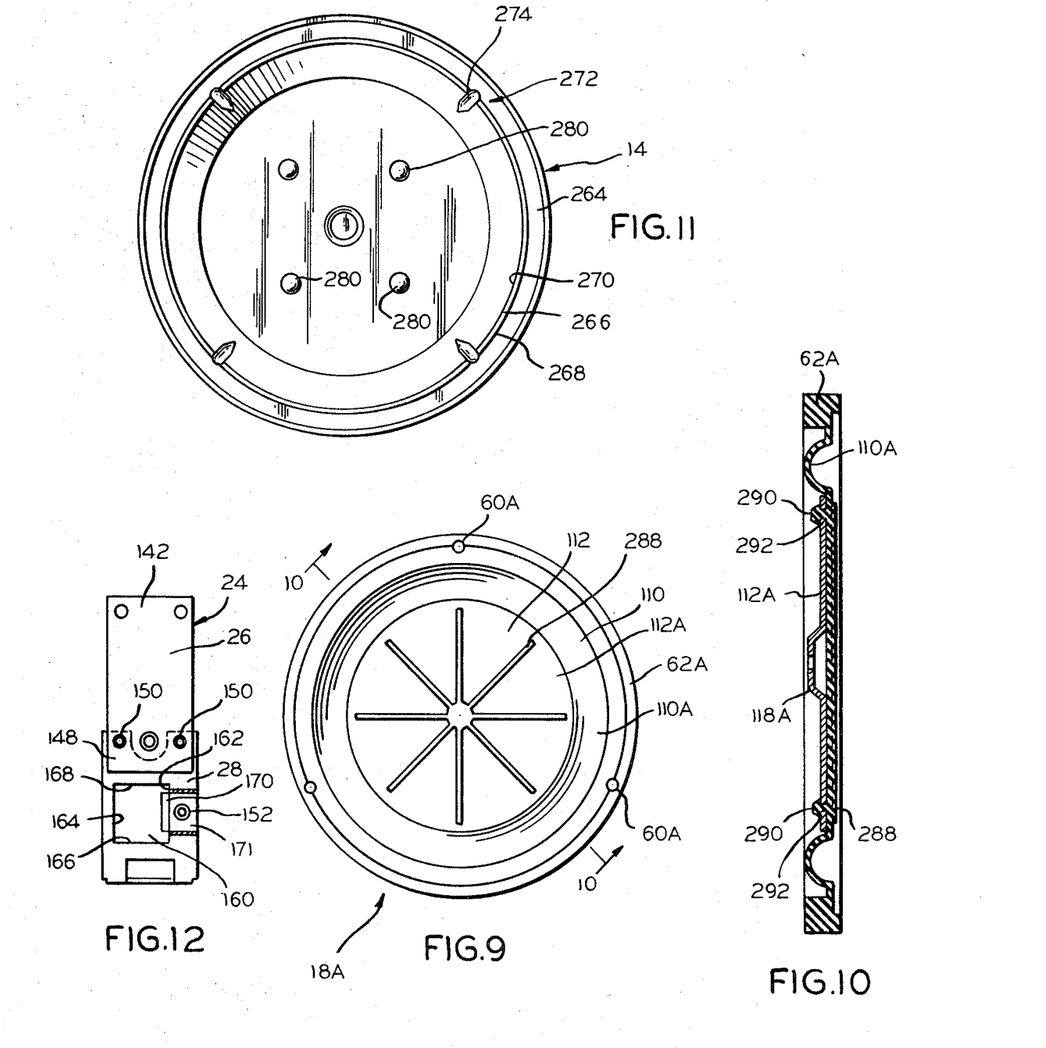
FIG. 9 is a rear plan view of a diaphragm for the gauge that is arranged for low pressure differential use.
FIG. 10 is a cross-sectional view taken substantially along line 10—10 of FIG. 9.
FIG. 11 is a plan view of the housing back cover member showing the inside of same.
FIG. 12 is a plan view of the range spring and magnet assembly, taken substantially along line 12—12 of FIG. 6.

The cover 14 is formed with four spaced semispherical protuberances 280 to prevent the diaphragm from snugly contacting the inside surface of cover member 14. In application to the housing 12, the edge 282 of its wall 262 is turned over against annular shoulder 284 of housing wall rim 58 to compress the rim 62 of the diaphragm therebetween for sealing purposes.

In the showing of FIGS. 9 and 10, a diaphragm 18A is illustrated that is suitable for low-pressure differential purposes and comprises rim portion 62A, flexible indentation 110A, and central portion 112A of increased diameter, to which is attached modified diaphragm plate 118A, the diaphragm being formed on one side thereof with suitable reinforcing ribs 288 and on the other side thereof with suitable headed studs 290 that are adapted to be frictionally received through suitable openings 292 in the diaphragm plate 118A. The diaphragm plate 118A is secured by coupling device 72 to the leaf spring 26 in the position illustrated in FIG. 3 for the diaphragm 18 and its plate 118, with the filler plates 66 and 68 being eliminated, for low-pressure differential applications. Diaphragm 18A at its rim 62A is formed with spaced passages 60A that serve the same purpose as passages 60 of diaphragm 18.

In the embodiment 10A of FIGS. 13–15, the gauge spring 24A comprises leaf spring 26A fixed to the housing 12A, by having one of its ends 142A secured thereto by suitable screws 146A under spring retainer plate 300, The other end 148A of the leaf spring includes an extension 302 that has secured thereto the plate magnet 30 and its plate 171, as by employing appropriate rivet 152A.

The wishbone structure 71 generally comprises a wishbone-shaped member 304 formed from a suitable light weight material, such as aluminum of a suitable gauge, and defining spaced arms 306 and 308 that are mounted on the respective housing studs 90A (FIG. 14), as by employing suitable screws 310. Intermediate its arms 306 and 308 the wishbone member 304 includes projecting portion 312 provided with a pair of projections 314 over which scale plate 92A is force fitted.

Wishbone member 304 includes projecting end portion 316 that is formed to define spaced mounting arms 318 and 320 (see FIG. 15) between which the helix 32 is journaled, with the helix 32 of the embodiment of FIGS. 13–15 being disposed adjacent magnet 30 and its plate 171 in the manner indicated in FIGS. 13 and 15 to provide the relationship already described with reference to gauge 10.

Wishbone projecting end portion 316 is formed with an opening 322 through which the screw member 230A of the modified zero adjustment device 44A projects for cooperation with a suitable nut structure carried by the wishbone member 304 in alignment with opening 322, which may be in the form of the U-type clip nut structure 324 (of the type manufactured by Tinnerman Products, Inc.) that is applied over the wishbone projecting end portion 316.

The screw member 230A has its threaded portion 242A threadedly engage with the nut structure 324 and is journaled in opening 236 of the housing by being held between lock ring 235 and washer 330.

The leaf spring 148A is secured to the diaphragm by connecting device 72.

By the application of a suitable tool to the head 232A of the screw member 230A, screw member 230A may be rotated to move nut structure 324, and thus the end portion 316 of wishbone member 304, axially of the screw member 230A to provide the zero adjustment for the gauge 10A.

The gauge 10A is otherwise substantially identical to gauge 10, as indicated by corresponding reference numerals.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In a gauge that comprises a differential pressure capsule having a flexible diaphragm separating high- and low-pressure chambers, said capsule including a housing in which a helix is journaled for rotation about its axis, with the helix having an indicator connected thereto and a magnet for producing rotational movement of said helix in response to linear movement of said magnet alongside the axis of the helix, and a zero datum adjacent to which the indicator is disposed, the improvement wherein:

said magnet is mounted on a leaf spring member, said leaf spring member being anchored to said housing cantilever fashion at one end thereof and including a window adjacent the other end thereof, said leaf spring member being disposed to extend generally transversely of the axis of said helix with said helix aligned with said window, said magnet being mounted on said leaf spring member adjacent said window in magnetic attraction relation to said helix, said diaphragm being connected to said spring member to shift said magnet substantially parallel to the axis of said helix on changes of pressure in one or more of said chambers, an adjustment device for adjusting the spring rate of said spring member and comprising:

a threaded member journaled in said housing in substantially parallel closely spaced relation to said spring member adjacent said one end of said spring member and having a threaded portion of same disposed between said one end thereof and said window, and a slide element threadedly received on said threaded portion of said threaded member and extending transversely of said spring member, said slide element having a length that is at least substantially equal to the width of said spring member, and being formed to define a V-shape ridge engaging said spring member, means for setting the indicator on the zero datum, said setting means comprising:

a second threaded member journaled in said housing adjacent the helix and including a threaded portion extending parallel to the helix, a second slide element threadedly received on said second threaded member threaded portion, means for maintaining said second slide element against rotation of said second threaded member, said second threaded member being disposed in substantial alignment with the other end of said spring member, and a tension spring connected between said second slide element and said other end of said spring member, and means for selectively rotating said threaded member.

2. The improvement set forth in claim 7 wherein:

the interior of said housing serves as the low-pressure chamber on one side of the diaphragm, and wherein the high-pressure chamber is defined on the other side of the diaphragm by a dished cover member overlying said diaphragm and secured to said housing.

3. The improvement set forth in claim 9 wherein:

said housing is provided with low- and high-pressure connections on the same side of said diaphragm, said diaphragm having at least one passageway through the rim thereof, one of said connections communicating with the passageway through the diaphragm rim;

said diaphragm rim being in fluidtight relationship between said housing and said cover member, and means for communicating said high-pressure chamber with said passageway in said rim including an annular groove in the respective portions of said housing and cover member between which the rim of the diaphragm is clamped, said passageway communicating between said grooves.

4. The improvement set forth in claim 10 wherein:

the annular groove of said cover member is connected by at least one radially directed passageway to said high-pressure chamber.

5. The improvement set forth in claim 9 wherein:

said threaded members are in said low-pressure chamber, and including O-ring seal means about the respective threaded members and in sealing engagement with said housing to seal off said low-pressure chamber at said threaded members.

6. The improvement set forth in claim 12 wherein:

said second threaded member includes a flange thereabout in engagement with an outwardly facing wall of said housing, said flange of said second threaded member and said tension spring serving as the means for journaling said second threaded member in said housing.

7. In a gauge that includes linear to rotary motion transforming means including a helix journaled for rotation about its axis, with the helix having an indicator connected thereto, a magnet for producing rotational movement of said helix in response to linear movement of the magnet alongside the axis of the helix, and a housing for the helix and magnet, the improvement wherein:

said magnet is mounted on a leaf spring member, said leaf spring member being anchored to said housing cantilever fashion at one end thereof, said leaf spring member being disposed to extend generally transversely of the axis of said helix with said helix aligned with said spring member, said magnet being mounted on said leaf spring member adjacent to and in magnetic attraction relation to said helix, sensing means connected to said spring member to shift said magnet substantially parallel to the axis of said helix and comprising a flexible diaphragm separating high- and low-pressure chambers in the gauge, and an adjustment device for adjusting the spring rate of said spring member and comprising:

a threaded member journaled in said housing in substantially parallel closely spaced relation to said spring member adjacent said one end of said spring member and having a threaded portion of same disposed between said one end thereof and said magnet, and a slide element threadedly received on said threaded portion of said threaded member and extending transversely of said spring member, said slide element having a length that is at least substantially equal to the width of said spring member, nd being formed to define a fulcrum engaging said spring member and extending transversely thereof, means for setting the indicator on a zero datum, said setting means comprising:

a second threaded member journaled in said housing adjacent the helix and including a threaded portion extending parallel to the helix, means for transforming rotary motion of said second threaded member into movement of said magnet parallel to the axis of said helix to set the indicator on the datum, a wishbone structure having its arms secured to said housing to mount said wishbone structure cantilever fashion to define a projecting end portion, said helix being carried by said wishbone structure adjacent said projecting end portion thereof, said wishbone structure including nut means threadedly engaged with said second threaded member to provide said transforming means, said leaf spring member including an off center extension at the other end thereof, said magnet being mounted on said leaf spring member extension.

8. The improvement set forth in claim 7 wherein:

the interior of said housing serves as the low-pressure chamber on one side of the diaphragm, and wherein the high-pressure chamber is defined on the other side of the diaphragm by a dished cover member overlying said diaphragm and secured to said housing.

9. The improvement set forth in claim 8 wherein:

said housing is provided with low- and high-pressure connections on the same side of said diaphragm, said diaphragm having a peripheral rim and at least one passageway through the rim thereof, one of said connections communicating with the passageway through the diaphragm rim, said diaphragm rim being in fluidtight relationship between said housing and said cover member, and means for communicating said high-pressure chamber with said one passageway in said rim including annular grooves in the respective portions of said housing and cover member between which the rim of the diaphragm is clamped, said one passageway communicating with said high pressure chamber between said grooves.

11. The improvement set forth in claim 9 wherein:

the annular groove of said cover member is connected by at least one radially directed passageway to said high-pressure chamber.

10. The improvement set forth in claim 8 wherein:

said threaded members are in said low-pressure chamber, and including O-ring seal means about the respective threaded members and in sealing engagement with said housing to seal off said low-pressure chamber at said threaded members.

12. In a differential pressure sensitive device wherein a flexible diaphragm is mounted in a housing with means to apply low pressure on one side of the diaphragm and high pressure on the other side, with the housing including top and bottom members, and the diaphragm including a rim in circumambient relation thereabout, the improvement comprising:
   high-pressure and low-pressure connections to one of said housing members on the same side of the diaphragm,
   said diaphragm having at least one passageway through said rim thereof,
   means for clamping said diaphragm rim between said top and bottom housing members in fluid tight relationship therebetween,
   means for communicating the space on the side of the diaphragm opposite the side on which said connections are located, with said one passageway in said diaphragm rim,
   said communicating means including annular grooves defined by said rim and the respective surfaces of the top and bottom housing members between which said rim of the diaphragm is clamped, with said grooves being disposed on either side of said diaphragm,
   a passageway from one of said connections communicating with the groove of said grooves that is on said same side of said diaphragm,
   said diaphragm passageway communicating between said grooves,
   means connecting the other of said connections to said same side of said diaphragm,
   and means for connecting the other groove of said grooves to the other side of said diaphragm, 13. A differential pressure sensitive device in accordance with claim 12 in which
   the other annular groove of said grooves is connected by at least one passageway to the space between the diaphragm and said other housing member to form the second mentioned connecting means.

14. A differential pressure sensitive device in accordance with claim 13 in which:
   the rim of the diaphragm is clamped in fluidtight relationship between the top and bottom housing members inwardly of the location of said passageway in the diaphragm rim.

15. In a gauge that includes linear to rotary motion transforming means including a helix journaled for rotation about its axis, with the helix having an indicator connected thereto, a magnet for producing rotational movement of said helix in response to linear movement of the magnet alongside the axis of the helix, and a housing for the helix and magnet, the improvement wherein:
   said magnet is mounted on a leaf spring member,
   said leaf spring member being anchored to said housing cantilever fashion at one end thereof and a mounting plate on the other end including a window therein,
   said leaf spring member being disposed to extend generally transversely of the axis of said helix with said helix aligned with said window,
   said magnet being mounted on said leaf spring member adjacent to and in magnetic attraction relation to said helix,
   sensing means connected to said spring member to shift said magnet substantially parallel to the axis of said helix,
   and an adjustment device for adjusting the spring rate of said spring member and comprising:
   a threaded member journaled in said housing in substantially parallel closely spaced relation to said spring member adjacent said one end of said spring member and having a threaded portion of same disposed between sad one end thereof and said window,
   and a slide element threadedly received on said threaded portion of said threaded member and extending transversely of said spring member,
   said slide element having a length that is at least substantially equal to the width of said spring member, and being formed to define a V-shaped ridge engaging said pring member,
   means for setting the indicator on a zero datum,
   said setting means comprising:
   a screw member journaled in said housing adjacent the helix and including a threaded portion extending parallel to the helix,
   and means for transforming rotary motion of said screw member into movement of said magnet parallel to the axis of said helix to set the indicator on the datum,
   a wishbone structure having its arms secured to said housing to mount said wishbone structure cantilever fashion to define a projecting end portion,
   said helix being carried by said wishbone structure adjacent said end portion thereof,
   said wishbone structure including net means threadedly engaged with said screw member to provide said transforming means.

16. The improvement set forth in claim 15 wherein:
   said leaf spring member includes an off center extension at the other end thereof,
   said magnet being mounted on said leaf spring extension.

* * * * *

UNITED STATES PATENT OFFICE
CERTIFICATE OF CORRECTION

Patent No. __3,645,140__   Dated __February 29, 1972__

Inventor(s) __JAMES W. PHILLIPS and RICHARD S. ZOLUDOW__

It is certified that error appears in the above-identified patent and that said Letters Patent are hereby corrected as shown below:

Column 7, line 27, for "7" read -- 1 --;
Column 7, line 34, for "9" read -- 2 --;
Column 7, line 40, semicolon (;) should be a comma (,);
Column 7, line 49, for "10" read -- 3 --;
Column 7, line 53, for "9" read -- 2 --;
Column 7, line 59, for "12" read -- 5 --;
Column 8, line 21, for "nd" read -- and --;
Column 8, line 66, for "11" read -- 10 --;
Column 8, line 70, for "10" read -- 11 --;
Column 10, between lines 35 and 36, insert -- said setting means further comprising: --;
Column 10, line 41, for "net" read -- nut --.

Signed and sealed this 20th day of June 1972.

(SEAL)
Attest:

EDWARD M. FLETCHER, JR.
Attesting Officer

ROBERT GOTTSCHALK
Commissioner of Patents